(12) United States Patent
Tarasuk-Levin

(10) Patent No.: US 11,496,436 B2
(45) Date of Patent: Nov. 8, 2022

(54) MIGRATION OF VIRTUAL MACHINE LOCATED ON ITS OWN NETWORK

(71) Applicant: VMware, Inc., Palo Alto, CA (US)

(72) Inventor: Gabriel Tarasuk-Levin, San Jose, CA (US)

(73) Assignee: VMWARE, INC., Palo Alto, CA (US)

( * ) Notice: Subject to any disclaimer, the term of this patent is extended or adjusted under 35 U.S.C. 154(b) by 516 days.

(21) Appl. No.: 16/044,176

(22) Filed: Jul. 24, 2018

(65) Prior Publication Data

US 2020/0036675 A1  Jan. 30, 2020

(51) Int. Cl.
*G06F 9/455* (2018.01)
*H04L 61/103* (2022.01)
*H04L 12/46* (2006.01)

(52) U.S. Cl.
CPC ........ *H04L 61/103* (2013.01); *G06F 9/45558* (2013.01); *H04L 12/4633* (2013.01); *G06F 2009/4557* (2013.01); *G06F 2009/45595* (2013.01)

(58) Field of Classification Search
CPC ......... G06F 2009/45595; G06F 3/0647; G06F 9/45558; G06F 2009/4557; H04L 61/103
See application file for complete search history.

(56) References Cited

U.S. PATENT DOCUMENTS

| | | | |
|---|---|---|---|
| 8,429,647 B2 | 4/2013 | Zhou et al. | |
| 9,870,324 B2 | 1/2018 | Mattson, Jr. et al. | |
| 2009/0125904 A1* | 5/2009 | Nelson | G06F 9/45558 718/1 |
| 2009/0327392 A1* | 12/2009 | Tripathi | G06F 15/16 709/201 |
| 2010/0115080 A1* | 5/2010 | Kageyama | H04L 29/12028 709/223 |
| 2010/0287548 A1* | 11/2010 | Zhou | G06F 9/4856 718/1 |
| 2013/0205106 A1 | 8/2013 | Tati et al. | |
| 2014/0064104 A1* | 3/2014 | Nataraja | H04L 61/103 370/248 |
| 2014/0229944 A1* | 8/2014 | Wang | G06F 9/5088 718/1 |

* cited by examiner

*Primary Examiner* — Dong U Kim
(74) *Attorney, Agent, or Firm* — Dinsmore & Shohl LLP

(57) ABSTRACT

The disclosure provides an approach for eliminating issues associated with the use of an L2 extension and ARP calls after migrating a virtual machine from one host to another host. The approach involves placing nodes within a network within their own subnetworks, each subnetwork having an IP address range of one address. Placing nodes into subnets of one avoids intra-subnet forwarding, eliminating the need for ARP calls and for L2 extensions.

20 Claims, 2 Drawing Sheets

MIGRATION OF VIRTUAL MACHINE LOCATED ON ITS OWN NETWORK

BACKGROUND

Data centers often utilize virtual machines (VMs) that run within host computers. Deployment of VMs within hosts allows an efficient use of the host's resources, such as CPU cycles, memory, etc. The VMs within the data center or within a host are typically organized into subnets. A single subnet typically contains several VMs.

A subnet (or subnetwork) may be defined as a logical subdivision of an internet protocol (IP) network, such that the nodes within the subdivision do not need to communicate through a router. Subnets are connected through a router. Within the same subnet, endpoints may be addressed with a common, identical, most-significant bit-group in their IP address. A network with subnets typically has IP addresses that may be divided into two fields: (1) a network number or routing prefix, and (2) the rest field or host identifier. Each subnet may be referred to as its own separate network. For details on dividing an IP network into subnets using subnet masks, see U.S. Pat. No. 8,429,647, filed May 6, 2009, the entire contents of which are incorporated by reference herein.

A subnet is usually a relatively small subdivision of an IP network. Because within a subnet, media access control (MAC) addresses are used to organize forwarding tables within switches, a subnet may be referred to as a Layer 2 ("L2 network"). Within a larger network, such as one composed of subnets, IP addresses are used to organize routing tables within routers. IP addresses are used by routers because the structure of IP addresses contain organization that allows the size of routing tables to be decreased in size.

When a VM migrates to a different host within the same subnet, the VM must notify the switch within the subnet as to its new location, so that the switch can update its forwarding tables. The notification occurs through a reverse Address Resolution Protocol (ARP) call. In a reverse ARP call, the VM announces its new location (e.g., host) to the switch, and the switch may then forward packets to the VM's new location.

If a VM migrates to a host on a different subnet, then typically an L2 extension must be implemented between the subnets. An L2 extension is a software implementation of a tunneling protocol from one subnet into another. One well-known L2 extension software is virtual extensible local area network (VXLAN). VXLAN can support a large number of logical layer 2 networks over a physical IP network. Other tunneling protocols include Stateless Transport Tunneling (STT), Generic Network Virtualization Encapsulation (GE-NEVE), or Generic Routing Encapsulation (GRE).

ARP calls and reverse ARP calls on an L2 extension cause inefficiencies and issues resulting from added network complexity. ARP and reverse ARP calls within an L2 extension are an overhead that is best avoided. L2 extensions typically introduce high latency into a network and lead to problematic failure modes, such as failure modes resulting from unsynchronized L2 switches.

SUMMARY

Embodiments provide a method of migrating a virtual machine (VM) from a first host to a second host, the first host located within a computer system, the computer system comprising a plurality of routers, the method comprising, assigning the VM to a first network, by a first controller, wherein the first network has an address range of one address, and wherein the first controller manages a routing table for substantially all routers of the plurality of routers. The method further comprises migrating the VM from the first host to the second host, and updating a first routing table of a first router, by the first controller, to reflect a location of the VM at the second host, wherein the first router is one of the plurality of routers.

Further embodiments include a non-transitory computer-readable storage medium storing instructions that, when executed by a computer system, cause the computer system to perform the method set forth above, and a computer system programmed to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for eliminating issues associated with the use of an L2 extension together with ARP calls. The approach involves transmitting packets based on routing within a Layer 3 (L3), IP network, and avoiding intra-subnet forwarding. Intra-subnet forwarding is avoided by eliminating L2 switches and by placing each VM within its own subnet, such as by assigning a/32 IP address.

As used herein, the terms "L1," "L2," and "L3" mean "layer 1," "layer 2," and "layer 3," respectively. The terms refer to layers within network models, such as the seven-layer Open Systems Interconnection (OSI) Model or the four-layer transmission control protocol (TCP)/IP model. L1 refers to the physical layer, which is concerned with the transmission of data bits over physical mediums. L2 refers to the data link layer, which is concerned with transmission of frames between connected nodes on the physical layer, and uses MAC addresses that are analyzed by L2 switches. Layer 3 refers to the network layer, which is concerned with addressing, routing and traffic control of a multi-node network through IP addresses that are analyzed by L3 routers.

Figure 1:
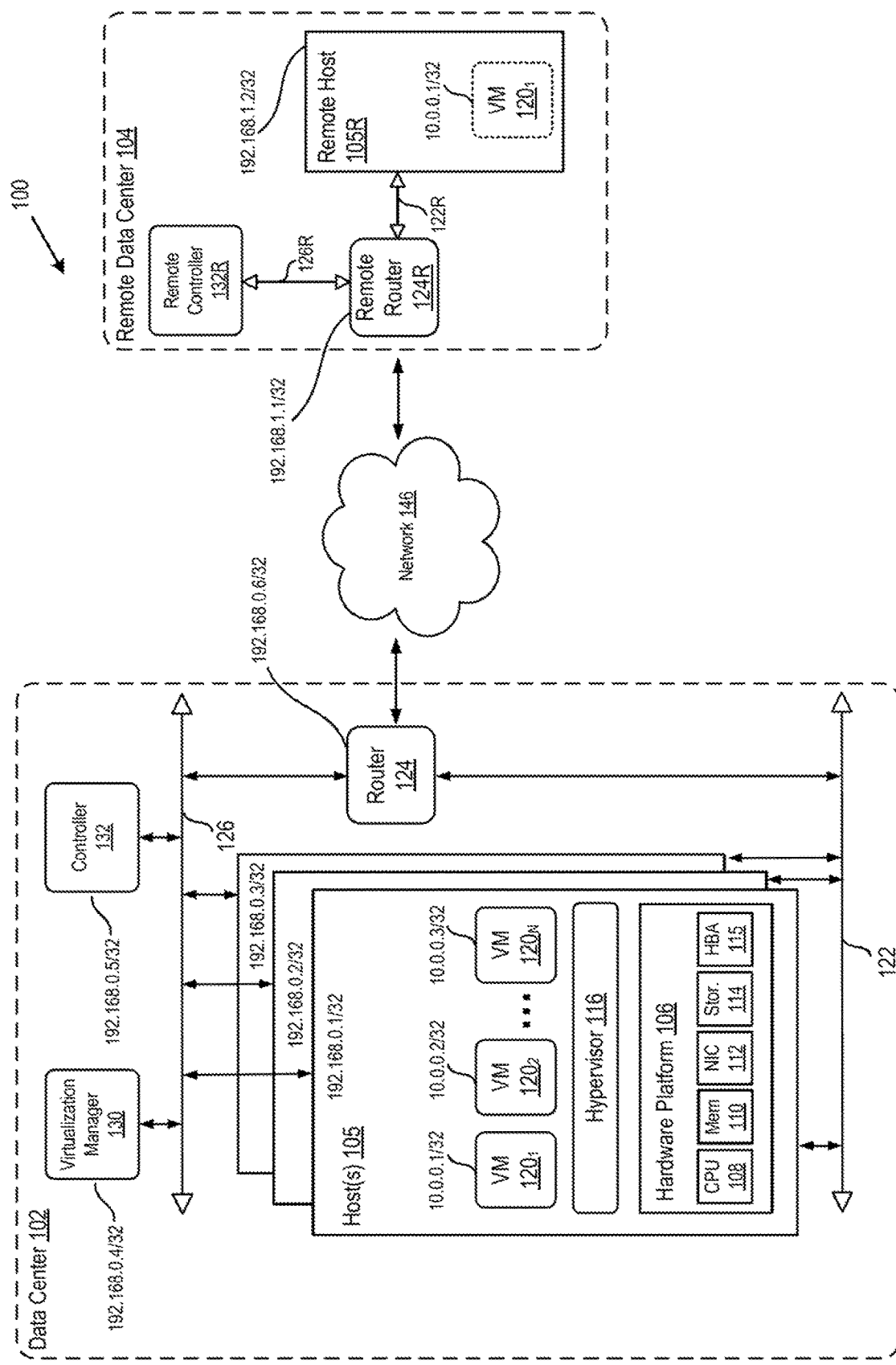
FIG. 1 depicts a block diagram of a computer system in which one or more embodiments of the present disclosure may be utilized.

FIG. 1 depicts a block diagram of a computer system 100 in which one or more embodiments of the present disclosure may be utilized. As shown, computer system 100 includes data center 102 and a remote data center 104, connected by a network 146. Remote data center 104 in FIG. 1 is depicted as a simplified data center relative to data center 102. Remote data center 104 may be substantially similar to data center 102 and may include the same components as data center 102. Components in remote data center 104 may be substantially similar to analogous components in data center 102. For brevity, only remote router 124R, remote controller 132R, and remote host 105R are shown within remote data center 104. Components in remote data center 104 may be connected substantially the same as components in data center 102 (e.g., through a data network 122R and a management network 126R).

In an embodiment, a single controller 132 exists among data centers 102 and 104, and in another embodiment, each data center 102/104 has its own controller 132/132R. Network 146 may be, for example, a direct link, a local area network (LAN), a wide area network (WAN) such as the Internet, another type of network, or a combination of these.

Data center 102 includes host(s) 105, a virtualization manager 130, a controller or central controller 132, a gateway router 124, a management network 126, and a data network 122. Each of hosts 105 may be constructed on a server grade hardware platform 106, such as an x86 architecture platform. For example, hosts 105 may be geographically co-located servers on the same rack. Host 105 is configured to provide a virtualization layer, also referred to as a hypervisor 116, that abstracts processor, memory, storage, and networking resources of hardware platform 106 into multiple virtual machines $120_1$ to $120_N$ (collectively referred to as VMs 120 and individually referred to as VM 120) that run concurrently on the same host. Hypervisor 116 may run on top of the operating system in host 105 or directly on hardware platform 106 of host 105. One example of a hypervisor 116 that may be used is a VMware ESXi™ hypervisor provided as part of the VMware vSphere® solution made commercially available from VMware, Inc. of Palo Alto, Calif.

Each VM 120 is on its own subnet or network. Placing VM 120 on its own subnet may be accomplished by placing each VM 120 on its own network and limiting the address range of the network to one address. For example, on an L3 network that uses an L3 protocol (e.g., TCP) running over IP version 4, a subnet of one node may be created by assigning a "/32" IP address to that node. In IPv4, each IP address is 32 bits long, and so a /32 IP address creates a network with an IP address range of one. On an L3 network that uses an L3 protocol (e.g., TCP) running over IP version 6, a subnet of one node may be created by assigning a "/128" IP address to that node. In IPv6, each IP address is 128 bits long, and so a /128 IP address creates a network with an IP address range of one.

FIG. 1 lists exemplary IP addresses that may be assigned by controller 132 to VM $120_1$, $120_2$, and $120_N$ if IPv4 were implemented within data center 102. VM $120_1$ may be assigned the IP address of 10.0.0.1/32, $120_2$ may be assigned the IP address of 10.0.0.2/32, and $120_N$ may be assigned the IP address of 10.0.0.3/32. VM $120_1$ is on network 10.0.0.1, VM $120_2$ is one network 10.0.0.2, and VM $120_N$ is on network 10.0.0.3. For more information on creating a network with an IP address range of one, see FIG. 2A of U.S. Pat. No. 8,429,647, incorporated herein above.

In an embodiment, when VM 120 sends a packet, VM 120 is programmed to transmit the packet to the router nearest to VM 120, such as router 124. If VM 120 is migrated to another host 105, such as from data center 102 to remote data center 104, then VM 120 continues to transmit its outgoing packets to the nearest router, such as remote router 124R. For example, in order for VM 120 to send a packet to remote data center 104, VM 120 always transmits a packet to router 124, the packet being addressed to an IP address located on remote data center 104, and router 124 proceeds to transmit the packet as per its routing table. Transmitting a packet by router 124 as per its routing table is accomplished by conventional routing protocols, such as TCP.

Further, in an embodiment, each host 105 is on its own subnet or network. As shown in FIG. 1, the three exemplary hosts may have IP addresses of 192.168.0.1/32, 192.168.0.2/32, and 192.168.0.3/32, respectively, with each host 105 being on its own network of one. The network of each host 105 is capable of holding only a single node because the network of each host 105 has an IP address range of one. In another embodiment, each host 105 is not on its own subnet, and the subnet containing host 105 contains other nodes, such as other hosts 105.

Remote host 105R is also on its own subnet or network. For example, remote host 105R may have an IP address of 192.168.1.2/32 on a network using an L3 protocol (e.g., TCP) running over IPv4. In this example, remote host 105R is on its own network, that network being 192.168.1.2, and that network being capable of containing no more than a single node, that node being remote host 105R. The network of remote host 105R is capable of holding only a single node because the network of remote host 105R has an IP address range of one.

In order for VM 120 to be migrated from host 105 to remote host 105R, data packets holding data of VM 120 are always transmitted to router 124. The packets holding data of VM 120 may be transmitted from host 105 or from virtualization manager 130. Packets holding data of VM 120 are transmitted to router 124, the packet being addressed to an IP address located on remote data center 104, such as IP address of remote host 105R (e.g., 192.168.1.2). And router 124 transmits the packets as per its routing table. No L2 extensions are required in order to, for example, extend the subnet on which VM 120 sits in order to migrate VM 120 from host 105 to remote host 105R.

Hardware platform 106 of each host 105 may include components of a computing device such as one or more processors (CPUs) 108, system memory 110, a network interface 112, storage system 114, a local host bus adapter (HBA) 115, and other I/O devices such as, for example, a mouse and keyboard (not shown). CPU 108 is configured to execute instructions, for example, executable instructions that perform one or more operations described herein and that may be stored in memory 110 and in storage 114. Network interface 112 enables host 105 to communicate with other devices via a communication medium, such as network 122 or network 126. Network interface 112 may include one or more network adapters, also referred to as Network Interface Cards (NICs). Storage system 114 represents local persistent storage devices (e.g., one or more hard disks, flash memory modules, solid state disks, and/or optical disks). Host bus adapter (HBA) couples host 105 to one or more external storages (not shown), such as a storage area network (SAN). Other external storages that may be used include network-attached storage (NAS) and other network data storage systems, which may be accessible via NIC 112.

System memory 110 is hardware allowing information, such as executable instructions, configurations, and other data, to be stored and retrieved. Memory 110 is where programs and data are kept when CPU 108 is actively using them. Memory 110 may be volatile memory or non-volatile memory. Volatile or non-persistent memory is memory that needs constant power in order to prevent data from being erased. Volatile memory describes conventional memory, such as dynamic random access memory (DRAM). Non-volatile memory is memory that is persistent (non-volatile). Non-volatile memory is memory that retains its data after having power cycled (turned off and then back on). Non-volatile memory is byte-addressable, random access non-volatile memory.

Virtualization manager 130 communicates with hosts 105 via a network, shown as a management network 126, and carries out administrative tasks for data center 102 such as managing hosts 105, managing local VMs 120 running within each host 105, provisioning VMs, migrating VMs from one host to another host, and load balancing between hosts 105. Virtualization manager 130 may be a computer program that resides and executes in a central server in data center 102 or, alternatively, virtualization manager 130 may run as a virtual appliance (e.g., a VM) in one of hosts 105. One example of a virtualization manager is the vCenter Server™ product made available from VMware, Inc.

Virtualization manager 130 is on its own subnet or network. For example, as shown in FIG. 1, virtualization manager 130 may have an IP address of 192.168.0.4/32 on a network using an L3 protocol (e.g., TCP) running over IPv4. In this example, virtualization manager 130 is on its own network, that network being 192.168.0.4, and that network being capable of containing no more than a single node, that node being virtualization manager 130. The network of virtualization manager 130 is capable of holding only a single node because the network of virtualization manager 130 has an IP address range of one. In another embodiment, virtualization manager 130 is not on its own subnet, and the subnet containing virtualization manager 130 contains other nodes, such as controller 132.

In one embodiment, virtualization manager 130 includes a hybrid cloud management module (not shown) configured to manage and integrate virtualized computing resources provided by remote data center 104 with virtualized computing resources of data center 102 to form a unified computing platform. Hybrid cloud manager module is configured to deploy VMs in remote data center 104, transfer VMs from data center 102 to remote data center 104, and perform other "cross-cloud" administrative tasks. In one implementation, hybrid cloud manager module is a plug-in complement to virtualization manager 130, although other implementations may be used, such as a separate computer program executing in a central server or running in a VM in one of hosts 105. One example of hybrid cloud manager module is the VMware Hybrid Cloud Extension® product made available from VMware, Inc.

Controller 132 or central controller 132 assigns IP addresses to virtual and physical devices running in data center 102. Controller 132 tracks locations of virtual and physical devices in data center 102 and centrally updates routing tables of each router or substantially all routers within data center 102. As used herein, the term "central controller" means that controller 132 is a single service or application, but controller 132 may be distributed such that copies of controller 132 are located throughout data center 102 or computer system 100, and the copies are synchronized through a synchronization mechanism. In an embodiment, to "centrally update" routing tables means to update routing tables by a software entity (i.e., controller 132) that is aware of the composition of routing tables of substantially routers within data center 102 or computer system 100. In an embodiment, remote controller 132R is present in remote data center 104, and remote controller 132R performs the same functions as controller 132, but for remote data center 104. Controller 132 may be a virtual appliance, a physical device, or a software module running within host 105. Controller 132 may be a virtual appliance such as one of VMs 120, or a distributed service running on one or more virtual appliances such as on one or more VMs 120. In another embodiment, a single controller, such as controller 132, is present among data center 102/104 and assigns IP addresses, tracks locations of devices, and centrally updates routing tables of each router or substantially all routers within both data center 102 and data center 104. Controller 132 may manage data center 102, remote data center 102R, or both. Controller 132 may be an NSX Controller, which is a component of VMware NSX™ commercially available from VMware, Inc. of Palo Alto, Calif.

Controller 132 is on its own subnet or network. For example, as shown in FIG. 1, controller 132 may have an IP address of 192.168.0.5/32 on a network using an L3 protocol (e.g., TCP) running over IPv4. In this example, controller 132 is on its own network, that network being 192.168.0.5, and that network being capable of containing no more than a single node, that node being controller 132. The network of controller 132 is capable of holding only a single node because the network of controller 132 has an IP address range of one. In another embodiment, controller 132 is not on its own subnet, and the subnet containing host 105 contains other nodes, such as virtualization manager 130.

Router 124 provides VMs 120 and other components in data center 102 with connectivity to network 146 used to communicate with remote data center 104. As used herein, a "router" is a device that routes packets between networks. In an embodiment, router 124 is the only router in data center 102 and each device in data center 102—each device being present within its own subnet—forwards its packets to router 124 for further transmission. In another embodiment, additional routers (not shown) may be present within data center 102, and each device in data center 102—each device being present within its own subnet—forwards its packets to the router closest to the device for further transmission of the packet. Such additional router(s) may be, for example, physical device(s) or may be implemented as virtual appliances within host 105 or within hypervisor 116 of host 105. One example of a router 124 is the NSX Edge™ services gateway (ESG) product made available from VMware, Inc.

Router 124 may manage external public IP addresses for VMs 120 and route traffic incoming to and outgoing from data center 102 and provide networking services, such as firewalls, network address translation (NAT), dynamic host configuration protocol (DHCP), and load balancing. Router 124 may use data network 122 to transmit data network packets to hosts 105. Router 124 may be a virtual appliance, a physical device, or a software module running within host 105.

Router 124 and remote router 124R are each on their own subnet or network. For example, as shown in FIG. 1, router 124 may have an IP address of 192.168.0.6/32 and remote router 124R may have an IP address of 192.168.1.1, on a network using an L3 protocol (e.g., TCP) running over IPv4. In this example, routers 124 and 124R are each on their own network, that network being 192.168.0.6 and 192.168.1.1 respectively, and that network being capable of containing no more than a single node. The network of router 124/124R is capable of holding only a single node because that network has an IP address range of one. In another embodiment, router 124 and remote router 124R are each not on their own subnet, and the subnet containing router 124 or router remote 124R contains other nodes.

Figure 2:
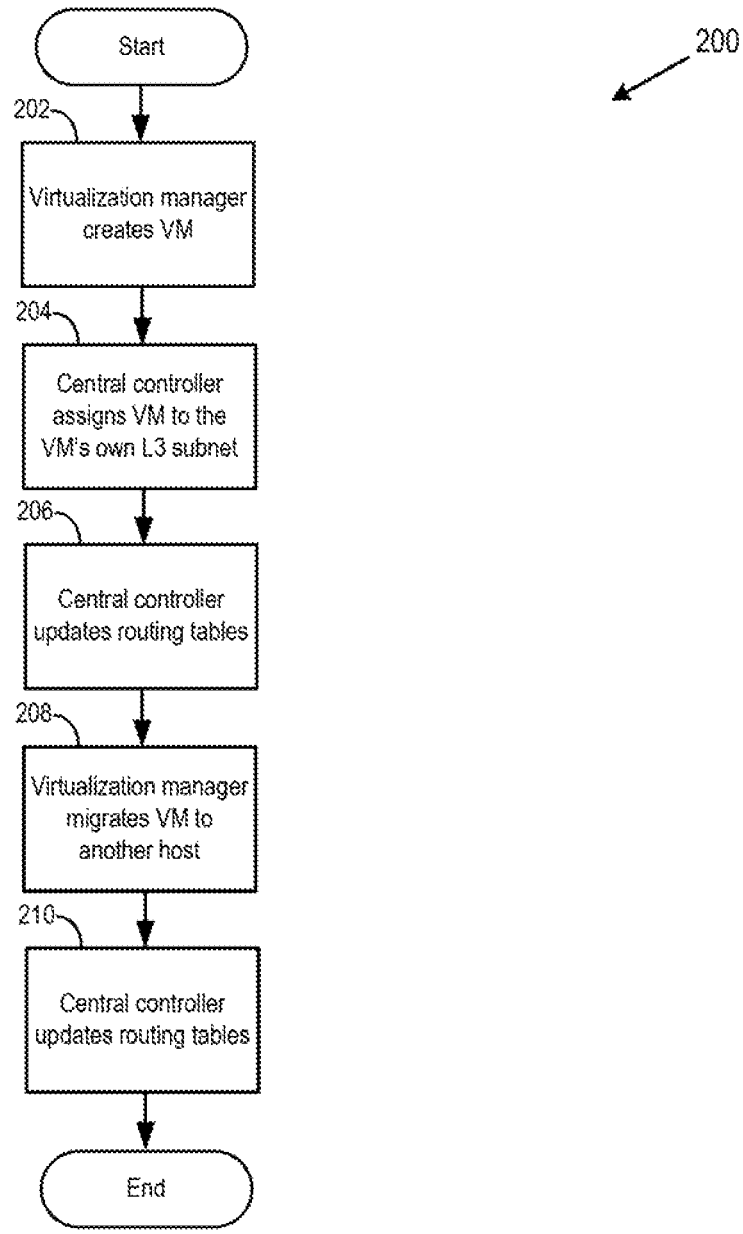
FIG. 2 depicts a flow diagram of a method of creating and migrating a virtual machine (VM) from one host to another host, according to an embodiment.

FIG. 2 depicts a flow diagram of a method 200 of creating and migrating VM 120 from one host to another host, according to an embodiment. For illustration purposes, method 200 describes creating VM $120_1$ and then migrating VM $120_1$ from host 105 to remote host 105R. In FIG. 1, a copy of VM $120_1$ is shown within remote host 105R in dashed lines, the dashed lines showing that the copy is being or has been migrated.

At step 202, virtualization manager 130 creates VM $120_1$. Virtualization manager 130 may be prompted to create VM $120_1$ by an administrator or automatically by a software module upon satisfaction of certain conditions. At step 204, controller 132 assigns VM $120_1$ to its own subnet or network, such as by assigning a /32 IP address in an L3 protocol running over IPv4. As shown in FIG. 1, controller 132 may assign IP address of 10.0.0.1/32 to VM $120_1$. As part of step 204, controller 132 updates its own records, such as tables, to reflect the creation of VM $120_1$ and the location of VM $120_1$ within data center 102 on host 105.

At step 206, controller 132 updates routing tables of routers within computer system 100, either directly or indirectly. For example, controller 132 updates routing table of router 124 and/or remote router 124R. The update adds an entry to each routing table for the newly created VM $120_1$. The entry may be similar to those shown in Table 1 and Table 2 below, and may include the destination IP or IP prefix, as well as the next hop to which the router should transmit the packet that has the particular destination IP or IP prefix. Table 1 shows an exemplary new entry for routing table of router 124, and Table 2 shows an exemplary new entry for routing table of remote router 124R.

TABLE 1

Entry in Router 124

| Destination IP | Next Hop |
|---|---|
| 10.0.0.1 | 192.168.0.1 |

TABLE 2

Entry in Remote Router 124R

| Destination IP | Next Hop |
|---|---|
| 10.0.0.1 | 192.168.0.6 |

Exemplary entry in Table 1 shows that if router 124 receives a packet with a destination IP of 10.0.0.1 (VM $120_1$), then router 124 should route this packet to IP address 192.168.0.1, which is the IP address of host 105 containing VM $120_1$. After host 105 receives a packet with a destination IP of 10.0.0.1, host 105 transmits the packet to destination VM $120_1$ through a virtual port (not shown) of hypervisor 116. Information as to what virtual port within hypervisor 116 is associated with destination VM $120_1$ is available within hypervisor 116 of destination host 105. Exemplary entry in Table 2 shows that if remote router 124R receives a packet with a destination IP of 10.0.0.1 (VM $120_1$), then remote router 124R should route this packet to IP address 192.168.0.6, which is the IP address of router 124 across network 146. It should be noted that network 146 may contain routers, in which case the "next hop" entry for remote router 124R would be the closest router to remote router 124R on the path to router 124.

Controller 132 may directly update router table of router 124 as per records of controller 132. If a single controller, such as controller 132, manages IP addresses and routing tables in both data center 102 and remote data center 104, then controller 132 may also directly update routing table of remote router 124R. Controller 132 may also directly update routing tables of any routers between remote router 124R and router 124.

If remote data center 104 has its own controller, such as remote controller 132R, then controller 132 may indirectly update routing table of router 124R. Controller 132 may transmit its updated records, reflecting creation of VM $120_1$, to remote controller 132R. Remote controller 132R would then update routing table of routers in remote data center 104, such as remote router 124R, as per the update received from controller 132.

At step 208, virtualization manager 130 migrates VM $120_1$ from one host to another host. For illustration purposes, virtualization manager 130 migrates VM $120_1$ from host 105 to remote host 105R. However, the same ideas would apply if VM $120_1$ were to be migrated from host 105 to another host 105 within the same data center, such as within data center 102, as long as the two hosts are located within their own, separate networks/subnets.

Virtualization manager 130 may be prompted to migrate VM $120_1$ by an administrator or automatically by a software module upon satisfaction of certain conditions under which a VM is to be migrated. FIG. 1 shows a copy of VM $120_1$ in dashed lines, located in remote data center 104, the dashed lines indicating that migration of VM $120_1$ may be in progress. Importantly, when migrating VM $120_1$ to another network, no L2 extension needs to be established between the two subnets. VM $120_1$ may be migrated by VM migration methods known in the art, such as the method described in U.S. patent application Ser. No. 13/760,868, filed Feb. 6, 2013, or the method described in U.S. Pat. No. 9,870,324, issued Jan. 16, 2018. The entire contents of both of these documents are incorporated by reference herein.

After migration of VM $120_1$ completes, the memory occupied by VM $120_1$ in host 105 is unreserved. As part of step 208, controller 132 and/or remote controller 132R updates its own records, such as tables, to reflect the migration of VM $120_1$ and the new location of VM $120_1$ within computer system 100.

At step 210, controller 132 and/or remote controller 132R updates routing tables of routers of computer system 100, such as router 124 and remote router 124R, to reflect the new location of VM $120_1$ within computer system 100. Logistics of transmitting the updates, directly or indirectly by router 124 and/or remote router 124R, may be substantially similar to logistics of transmitting routing table updates in step 206. The routing table entry of router 124, as shown in Table 1 above, may be updated to the entry shown in Table 3, below. The routing table entry of router 124R, as shown in Table 2 above, may be updated to the entry shown in Table 4, below.

TABLE 3

Entry in Router 124

| Destination IP | Next Hop |
|---|---|
| 10.0.0.1 | 192.168.1.1 |

TABLE 4

Entry in Remote Router 124R

| Destination IP | Next Hop |
|---|---|
| 10.0.0.1 | 192.168.1.2 |

Importantly, in order for packets destined for VM $120_1$ to reach VM $120_1$ at its new location, VM $120_1$ does not need to announce its new location to other VMs 120 or hosts 105, such as through a reverse ARP call. Also, no VMs 120 or hosts 105 need to send out requests to discover IP addresses or locations of other nodes, such as through ARP calls. If a switch is located between VM 120₁ and its nearest router, then VM 120₁ may need to update that switch through a reverse ARP call, but if no switch is located between VM 120₁ and its nearest router, then no tables within L2 switches need to be updated. In an embodiment, only router tables are updated. Further, routing tables of routers may be updated centrally or semi-centrally, such as by controller 132 and/or remote controller 132R. In order to update a routing table, dynamic routing protocols (such as Open shortest Path First (OSPF) or Routing Information Protocol (RIP)) do not need to be implemented on computer system 100.

Exemplary entry in Table 3 shows that if router 124 receives a packet with a destination IP of 10.0.0.1 (VM 120₁), then router 124 should route this packet to IP address 192.168.1.1, which is the IP address of remote router 124R. Exemplary entry in Table 4 shows that if remote router 124R receives a packet with a destination IP of 10.0.0.1 (VM 120₁), then remote router 124R should route this packet to IP address 192.168.1.2, which is the IP address of remote host 105R. After remote host 105 receives a packet with a destination IP of 10.0.0.1, remote host 105 is able to transmit the packet to the destination VM 120₁ through a virtual port association with VM 120₁. Information as to what virtual port within hypervisor 116 is associated with destination VM 120₁ is available within hypervisor 116 of destination host 105. It should be noted that network 146 may contain routers, in which case the "next hop" entry for router 124 would be the closest router to router 124 on the path to remote router 124R. After step 210, method 200 ends.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

I claim:

1. A method of migrating a virtual machine (VM) from a first host to a second host, the first host located within a computer system, the computer system comprising a plurality of routers, the method comprising:
   assigning the VM to a first network, by a first controller, wherein the first network has an address range of one address, and wherein the first controller manages a routing table for one or more routers of the plurality of routers, and wherein the VM is assigned a first IP address that is used for routing packets to the VM, the first IP address corresponding to the one address of the first network;
   migrating the VM from the first host to the second host, wherein the first host is assigned to a second network with a second address range of one address, the second network being different from a third network to which the second host is assigned to, the third network having a third address range of one address; and
   updating a first routing table of a first router, by the first controller, to reflect a location of the VM at the second host, wherein the first router is one of the plurality of routers, and wherein after the updating the first routing table continues to use the first IP address to identify the VM.

2. The method of claim 1, wherein the first host and the second host are located in a first data center, and wherein the first controller is configured to centrally manage routing tables of routers within the first data center, and wherein the first controller is a distributed controller located on a plurality of hosts within the computer system.

3. The method of claim 1, wherein the first host is located in a first data center, the second host is located in a second data center, the second data center comprising a second router, the method further comprising:
   updating a second routing table of the second router, by the first controller, to reflect the location of the VM at the second host.

4. The method of claim 1, wherein the first host is located in a first data center, the second host is located in a second data center, the second data center comprising a second router, the method further comprising:
   notifying a second controller, by the first controller, of the location of the VM at the second host; and
   updating a second routing table of the second router, by the second controller, to reflect the location of the VM at the second host.

5. The method of claim 1, wherein the VM transmits one or more outgoing packets of the VM to the first router.

6. The method of claim 1, wherein subsequent to completion of the migrating, the VM does not transmit an announcement of its new location to a switch.

7. The method of claim 1, wherein the migrating does not include migrating over a Layer 2 (L2) extension.

8. A non-transitory computer readable medium comprising instructions to be executed in a processor of a computer system, the instructions when executed in the processor cause the computer system to carry out a method of migrating a virtual machine (VM) from a first host to a second host, the first host located within a computer system, the computer system comprising a plurality of routers, the method comprising:
   assigning the VM to a first network, by a first controller, wherein the first network has an address range of one address, and wherein the first controller manages a routing table for one or more routers of the plurality of routers, and wherein the VM is assigned a first IP address that is used for routing packets to the VM, the first IP address corresponding to the one address of the first network;
   migrating the VM from the first host to the second host, wherein the first host is assigned to a second network with a second address range of one address, the second network being different from a third network to which the second host is assigned to, the third network having a third address range of one address; and
   updating a first routing table of a first router, by the first controller, to reflect a location of the VM at the second host, wherein the first controller is a distributed controller located on a plurality of hosts within the computer system, wherein the first router is one of the plurality of routers, and wherein after the updating the first routing table continues to use the first IP address to identify the VM.

9. The non-transitory computer readable medium of claim 8, wherein the first host and the second host are located in a first data center, and wherein the first controller is configured to centrally manage routing tables of routers within the first data center.

10. The non-transitory computer readable medium of claim 8, wherein the first host is located in a first data center, the second host is located in a second data center, the second data center comprising a second router, the method further comprising:
    updating a second routing table of the second router, by the first controller, to reflect the location of the VM at the second host.

11. The non-transitory computer readable medium of claim 8, wherein the first host is located in a first data center, the second host is located in a second data center, the second data center comprising a second router, the method further comprising:
    notifying a second controller, by the first controller, of the location of the VM at the second host; and
    updating a second routing table of the second router, by the second controller, to reflect the location of the VM at the second host.

12. The non-transitory computer readable medium of claim 8, wherein the VM transmits one or more outgoing packets of the VM to the first router.

13. The non-transitory computer readable medium of claim 8, wherein subsequent to completion of the migrating, the VM does not transmit an announcement of its new location to a switch.

14. The non-transitory computer readable medium of claim 8, wherein the migrating does not include migrating over a Layer 2 (L2) extension.

15. A computer system comprising:
a VM and a first host;
a first network;
a plurality of routers comprising a first router, the first router comprising a first routing table;
a first controller, wherein the first controller manages a routing table for one or more routers of the plurality of routers; and
at least one processor, wherein the at least one processor is programmed to carry out a method of migrating a virtual machine (VM) from the first host to a second host, said method comprising:
assigning the VM to the first network, by the first controller, wherein the first network has an address range of one address, and wherein the VM is assigned a first IP address that is used for routing packets to the VM, the first IP address corresponding to the one address of the first network;
migrating the VM from the first host to the second host, wherein the first host is assigned to a second network with a second address range of one address, the second network being different from a third network to which the second host is assigned to, the third network having a third address range of one address; and
updating the first routing table of the first router, by the first controller, to reflect a location of the VM at the second host, and wherein after the updating the first routing table continues to use the first IP address to identify the VM.

16. The computer system of claim 15, wherein the first host and the second host are located in a first data center, and wherein the first controller is configured to centrally manage routing tables of routers within the first data center.

17. The computer system of claim 15, wherein the first host is located in a first data center, the second host is located in a second data center, the second data center comprising a second router, the method further comprising:
updating a second routing table of the second router, by the first controller, to reflect the location of the VM at the second host.

18. The computer system of claim 15, wherein the first host is located in a first data center, the second host is located in a second data center, the second data center comprising a second router, the method further comprising:
notifying a second controller, by the first controller, of the location of the VM at the second host; and
updating a second routing table of the second router, by the second central controller, to reflect the location of the VM at the second host.

19. The computer system of claim 15, wherein subsequent to completion of the migrating, the VM does not transmit an announcement of its new location to a switch.

20. The computer system of claim 15, wherein the migrating does not include migrating over a Layer 2 (L2) extension.

* * * * *